UNITED STATES PATENT OFFICE.

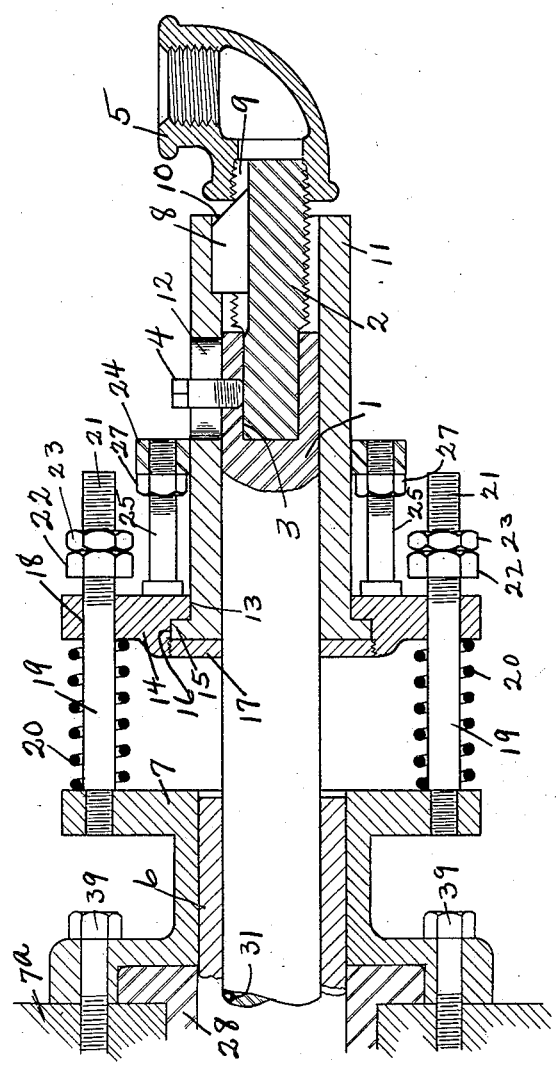

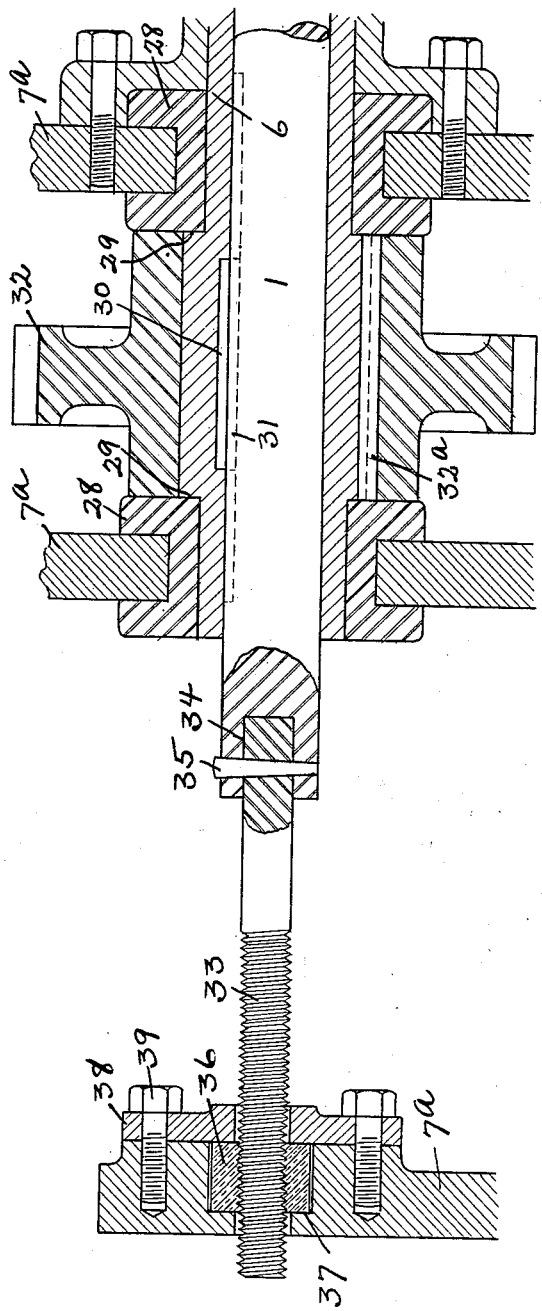

FRANK HIRSCH AND JOHN J. BEMER, OF ERIE, PENNSYLVANIA, ASSIGNORS TO JARECKI MANUFACTURING COMPANY, OF ERIE, PENNSYLVANIA, A CORPORATION OF PENNSYLVANIA.

SCREW-CUTTING MACHINE.

1,064,219. Specification of Letters Patent. Patented June 10, 1913.

Application filed November 20, 1911. Serial No. 661,258.

*To all whom it may concern:*

Be it known that we, FRANK HIRSCH and JOHN J. BEMER, citizens of the United States, residing at Erie, in the county of Erie and State of Pennsylvania, have invented new and useful Improvements in Screw-Cutting Machines, of which the following is a specification.

This invention relates to screw cutting machines, and consists in certain improvements in the construction thereof as will be hereinafter fully described and pointed out in the claims.

The invention is illustrated in the accompanying drawings as follows:—

Figure 1 shows a central section of the forward end of the spindle and its connections. Fig. 2 shows a central section of the rear end of the spindle, its connections and supports.

1 marks the screw cutter spindle, 2 the screw cutter which as shown is in the form of a tap. The tap extends into a socket 3 in the end of the spindle and is secured therein by a set screw 4. A fitting 5 is shown as being operated upon by the tap. The spindle is carried in the bearing sleeve 6. A face cutter 8 is arranged in one of the grooves 9 of the tap and extends into a groove 10 in the face cutter spindle 11.

The face cutter spindle has the elongated slot 12 through which the set screw 14 extends, thus allowing the relative movement of the spindles and at the same time, locking the spindles so as to rotate together.

The spindle 11 extends through a perforation 13 in a collar 14. The spindle 11 terminates in a shoulder 15 which is arranged in the annular groove 16 and locked in place therein by a nut 17. In this way, the spindle 11 is locked with the collar 14 in an axial direction but is free to rotate therein.

Studs 19 extend through the perforations 18 in the collar 14. They are screwed into a plate 7 on the frame 7ª. Springs 20 are arranged around the studs 19 between the plates 7 and collar 14.

A sliding collar 24 is arranged on the spindle 11. Screws 25 extend into the screw threaded perforations 26 in the collar 24. The screws 25 may be thus adjusted and locked in adjustment by the jam nuts 27. Screws 25 extending in position to contact the collar 14 and the sliding collar 24 is in position to be engaged by the set screw 4.

The screw cutter spindle is actuated by the ordinary mechanism of a screw cutting machine to feed forward and to be withdrawn. These mechanisms are of ordinary construction and are not shown. As the spindle moves forward carrying with it the screw cutting device, the collar 24 is permitted to move forward as the set screw 4 moves forward with the screw cuttter spindle 1, and this allows the forward movement of the spindle 11 under the influence of the springs on the collar 14. In this way, the face cutter spindle is carried forward so as to bring the face cutter into position to operate on the end of the fitting. The ends of the studs 19 are screw threaded at 21 and the stop nuts 22 are arranged in these screw threads and locked in adjustment by the jam nuts 23. The face cutter spindle 11 moves forward until the collar 14 engages the stop nut 22. When its forward movement is arrested it allows the screw cutter spindle to advance and complete the screw. Upon the return movement of the screw cutter spindle, the set screw 4 contacts the collar 24 and this through the screws 25 forces the collar 14 against the force of the springs 20. By adjusting the screws 25, the point at which the spindle 11 is picked up on the return movement may be adjusted so as to give sufficient movement to the screw cutting spindle to give it the proper clearance and feeding movement.

The spindle sleeve 6 is mounted in the bearings 28, these bearings being carried by portions of the frame 7ª. The sleeve 6 has the shoulders 29 which engage the bearings 28 and prevent axial movement of the bearing sleeve. A spline 30 is arranged within the sleeve and operates in a groove 31 in the spindle, thus locking the sleeve and spindle rotatively but leaving the spindle free to move axially in the sleeve. A gear 32 is locked with the sleeve 6 by means of the key 32ª. The gear 32 is driven with the ordinary mechanism used in machines of this type having the usual reversing mechanism (not shown) common to these machines.

A lead screw 33 extends to a socket 34 in the end of the spindle and is locked in place by the pin 35. The lead screw operates in the nut 36. The nut is arranged in a socket 37 in a portion of the frame 7ª. It is held in the socket by a plate 38 which is secured by screws 39. It will be noted that the parts of the frame 7ª are connected, forming parts of an ordinary frame.

In operation, it will be noted that as the gear 32 is driven in a forward direction, the sleeve 6 is rotated and with it the spindle. The spindle under the influence of the lead screw moves forward, picks up the sleeve 11 carrying with it the cutter 8. On the return movement, the reverse of this action takes place. The sleeve 11 as heretofore described travels but a portion of the distance that the spindle 1 travels. The entire axial movement, however, is effected by the lead screw.

What we claim as new is:—

1. In a screw cutting machine, the combination of a spindle; a face cutter rotated with the spindle; a screw cutter carried by the spindle; a feed screw operating on the spindle; a yielding pressure device exerting pressure on the face cutter to force it forward; means for actuating the face cutter to force it backward with the backward movement of the spindle and against the pressure device; and a stop for limiting the forward movement of the face cutter under the influence of the pressure device to less than the forward movement of the spindle.

2. In a screw cutting machine, the combination of a spindle; a face cutter rotated with the spindle; a screw cutter carried by the spindle; a feed screw operating on the spindle; a yielding pressure device for exerting pressure on the face cutter to force it forward into cutting position; and means actuated by the spindle for forcing the face cutter axially with the spindle to withdraw it.

3. In a screw cutting machine, the combination of a spindle; a face cutter rotated with the spindle; a screw cutter carried by the spindle; a feed screw operating on the spindle; a yielding pressure device for exerting pressure on the face cutter to force it forward into cutting position; means actuated by the spindle for forcing the face cutter axially with the spindle to withdraw it; and a stop for limiting the feed movement of the face cutter independently of the movement of the screw cutter.

4. In a screw cutting machine, the combination of a spindle; a face cutter rotated with the spindle; a screw cutter carried by the spindle; a feed screw operating on the spindle; a spring exerting pressure on the face cutter to actuate it in one direction; and means actuated by the spindle for actuating the face cutter axially with the spindle and against the spring in the opposite direction.

5. In a screw cutting machine, the combination of a spindle; a face cutter rotated with the spindle; a screw cutter carried by the spindle; a feed screw operating on the spindle; a spring exerting pressure on the face cutter to actuate it in one direction; means actuated by the spindle for actuating the face cutter axially with the spindle and against the spring in the opposite direction; and a stop for limiting the forward movement of the cutter.

6. In a screw cutting machine, the combination of a screw cutter spindle; a face cutter rotated with said spindle; a screw cutter carried by said spindle; a face cutter spindle arranged over the screw cutter spindle; a yielding pressure device exerting pressure on said face cutter spindle to actuate it in one direction; and means for connecting the face cutter spindle with the screw cutter spindle to operate in the opposite direction.

7. In a screw cutting machine, the combination of a screw cutter spindle; a face cutter rotated with said spindle; a screw cutter carried by said spindle; a face cutter spindle arranged over the screw cutter spindle; a yielding pressure device exerting pressure on said face cutter spindle to actuate it in one direction; means for connecting the face cutter spindle with the screw cutter spindle to operate in the opposite direction; and a stop for limiting the movement of the face cutter spindle to less than the axial movement of the screw cutter spindle.

8. In a screw cutting machine, the combination of a screw cutter spindle; a face cutter rotated with said spindle; a screw cutter carried by said spindle; a face cutter spindle arranged over the screw cutter spindle; a yielding pressure device exerting pressure on said face cutter spindle to actuate it in one direction; means for connecting the face cutter spindle with the screw cutter spindle to operate in the opposite direction; a stop for limiting the movement of the face cutter spindle to less than the axial movement of the screw cutter spindle; and means for adjusting said stop.

9. In a screw cutting machine, the combination of a screw cutter spindle; a face cutter rotated with the spindle; a screw cutter carried by the spindle; a face cutter spindle arranged on and extending over the screw cutter spindle; a journal for the spindle; a plate fixed with the journal; a collar rotatively mounted on the face cutter spindle but locked axially therewith; studs extending from said plate to said collar; springs on said studs; and means actuated by the screw cutter spindle for actuating said collar in one direction.

10. In a screw cutting machine, the combination of a screw cutter spindle; a face cutter rotated with the spindle; a screw cutter carried by the spindle; a face cutter spindle arranged on and extending over the screw cutter spindle; a journal for the spindle; a plate fixed with the journal; a collar rotatively mounted on the face cutter spindle but locked axially therewith; studs extending from said plate to said collar; springs on said studs; a sliding collar on said face cutter spindle; adjustable means between said sliding collar and said locked collar; and means on the screw cutter spindle for engaging the said sliding collar.

11. In a screw cutting machine, the combination of a screw cutter spindle; a face cutter rotated with said spindle; a screw cutter carried by said spindle; a face cutter spindle arranged on and extending over the screw cutter spindle, said spindle having a slot therein; a set screw extending through said slot for securing the screw cutter in said spindle and for locking said spindle against rotative movement relatively to each other; a yielding pressure device; means actuated by the set screw for moving the face cutter spindle in one direction; and devices for moving the face cutter spindle in the opposite direction.

In testimony whereof we have hereunto set our hands in the presence of two subscribing witnesses.

FRANK HIRSCH.
JOHN J. BEMER.

Witnesses:
B. M. HARTMAN,
H. C. LORD.

Copies of this patent may be obtained for five cents each, by addressing the "Commissioner of Patents, Washington, D. C."